United States Patent [19]
Skold et al.

[11] 3,947,532
[45] Mar. 30, 1976

[54] LIQUID DISTRIBUTION STRIP

[75] Inventors: Jan O. Skold, Fort Myers, Fla.; Virendra Nath Kapoor, Amherst, N.Y.

[73] Assignees: Buffalo Forge Company, Buffalo, N.Y.; Aktiebolaget Carl Munters, Sollentuna, Sweden; part interest to each

[22] Filed: June 17, 1974

[21] Appl. No.: 480,207

[52] U.S. Cl. ............ 261/112; 261/DIG. 11; 55/229
[51] Int. Cl. ............................................. B01d 47/00
[58] Field of Search ...... 261/112, 110, 97, DIG. 11; 55/229, 241

[56] References Cited
UNITED STATES PATENTS

| | | | |
|---|---|---|---|
| 1,928,904 | 10/1933 | Mart | 261/DIG. 11 |
| 2,054,809 | 9/1936 | Fleisher | 261/112 |
| 2,776,121 | 1/1957 | Fordyce | 261/110 |
| 3,115,534 | 12/1963 | Bottner | 261/DIG. 11 |
| 3,500,615 | 3/1970 | Meek | 261/112 |
| 3,792,841 | 2/1974 | Munters | 261/112 |

FOREIGN PATENTS OR APPLICATIONS

| | | | |
|---|---|---|---|
| 1,086,215 | 2/1959 | Germany | 261/97 |

*Primary Examiner*—Tim R. Miles
*Assistant Examiner*—Gregory N. Clements
*Attorney, Agent, or Firm*—John A. Mitchell; Pasquale A. Razzano

[57] ABSTRACT

A gas and liquid contact apparatus includes at least one pair of generally vertically aligned contact bodies having pairs of opposed generally vertically and horizontally extending edge portions. The contact bodies have passageways formed therein which penetrate between the two opposed vertical edges of the body, with the horizontal edges thereof being open to admit liquid into the passageways. A liquid impervious distribution strip is located between the adjacent spaced horizontal edges of the contact bodies and extends across one of the vertical edges thereof, to deflect liquid migrating to the one vertical edge toward the other vertical edge of the contact body therebelow.

14 Claims, 3 Drawing Figures

LIQUID DISTRIBUTION STRIP

The present invention relates to a gas and liquid contact apparatus and, more particularly, to a gas and liquid contact apparatus of the type described in U.S. Pat. No. 3,792,841.

The gas and liquid contact apparatus described in U.S. Pat. 3,792,841 consists essentially of a contact body for use in cross flow cooling towers, wherein the contact body is formed of sheets of corrugated material having folds or corrugations in adjacent sheets inclined with respect to one another. The angles of inclination of the corrugations in the sheets are selected so as to obtain an unexpected optimum of exchange between the gas and liquid flowing through the contact body.

In contact bodies of that type, the liquid which flows vertically through the passageways formed in the body between the corrugations of the respective sheets therein is affected by the gas flow which moves through the contact body at a crosswise angle to the direction of flow of the liquid. This gas flow tends to produce lateral displacement of the liquid within the contact body and may cause liquid to be blown out of the contact body with the gas stream in the form of droplets. Such lateral displacement of the liquid increases substantially the resistance to the gas flow and causes the liquid to bubble and foam between the sheets and also tends to blow it out from the film. The specific contact body structure disclosed in this patent is constructed to overcome these problems and to reduce liquid migration as a result of gas flow and to prevent the formation of liquid droplets in the contact body. Although that structure has been found to be highly satisfactory in use, it also has been found that where contact bodies of that type of construction are used in large heights, for example six feet or more, the liquid in the contact body tends to migrate towards the gas outlet side of the contact body, collecting on that side, and tends to be expelled therefrom as liquid droplets; thereby possibly reducing the effectiveness of the tall cooling tower or a tall evaporative cooler in which the contact body can be used. This also may happen where the gas flow rate through the contact body is too great, or where the liquid flow rate is too high, for optimum operating conditions.

Accordingly, it is an object of the present invention to provide a gas and liquid contact in which substantially all of the liquid flowing through the contact body is maintained within the contact body and directed towards the gas inlet side thereof, in order to overcome the effects of liquid migration.

Yet another object of the present invention is to provide a device for redirecting liquid fluid from the gas outlet side of a contact body in a cooling tower evaporative cooler or the like, to the gas inlet side thereof.

Another object of the present invention is to provide a gas and liquid contact apparatus of the character described which is relatively inexpensive in construction and simple in manufacture.

A still further object of the present invention is to provide a liquid distribution plate or correction device for gas and liquid contact bodies, which is relatively simple and inexpensive in construction.

The above and other objects, features and advantages of the present invention will be apparent from the following detailed description of illustrative embodiments thereof, which are to be considered in connection with the accompanying drawings, wherein.

Figure 1:
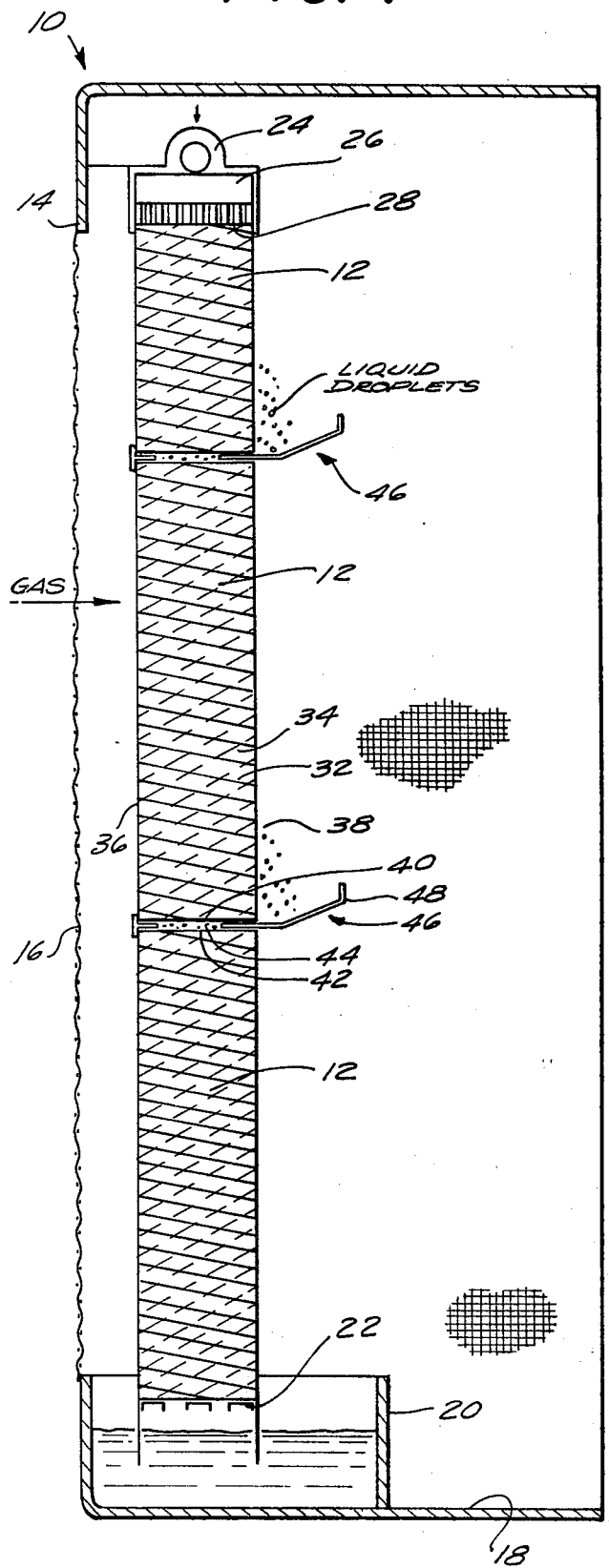
FIG. 1 is a partially schematic vertical sectional view of an evaporative cooler or a cooling tower constructed in accordance with the present invention.

Referring now to the drawing in detail, and initially to FIG. 1 thereof, it will be seen that a cooling tower 10, embodying the features of the present invention, includes a plurality of contact bodies 12 mounted in the tower in any convenient manner and arranged in generally vertical alignment, but in slightly spaced relation to each other. The contact bodies are positioned adjacent an opening 14 in housing 10 through which the cooling gas is supplied. The opening may be covered by a wire mesh screen 16 if desired.

The base 18 of cooling tower 10 includes a liquid collecting basin or chamber 20 and a plurality of channel members 22 extend across the chamber to provide support for the contact bodies 12.

Liquid to be cooled is supplied to the contact bodies 12 at the top of the cooling tower through a distributor 24 of conventional construction. For example, this distributor may consist of a supply pipe having escape holes on its lower side, although it is contemplated that the distributor may be of a rotating or otherwise movable type. In addition, if desired, one or more distributor bodies 26, also of conventional construction, can be supplied in order to insure uniform distribution of the liquid along the top edge 28 of the uppermost contact body 12.

Figure 2:
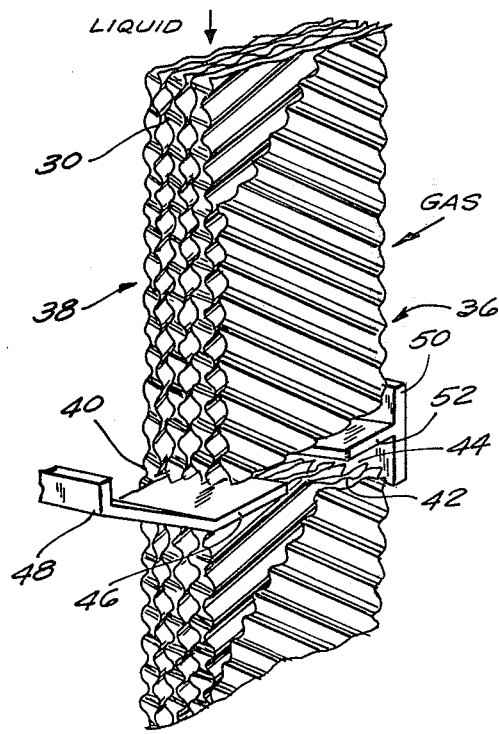
FIG. 2 is a fragmentary perspective view showing the relation of the gas distribution plate to the contact bodies of the cooling tower.

As seen in the fragmentary illustration of FIG. 2, contact bodies 12 consist of thin layers or sheets, which preferably are folded or corrugated, and are positioned vertically, with the vertical edges 30 of the sheets extending in the direction of gas flow. The folds or corrugations cross one another in adjacent layers, intersecting at a predetermined angle, as described in U.S. Pat. No. 3,792,841. The sheets are bonded together at the points of contact between adjacent corrugations by a suitable binding agent or the like.

For illustrative purposes, in FIG. 1 the solid lines 32 denote the corrugations in every second layer, and the dotted lines 34 denote the corrugations in the layers therebtween. In this manner, the corrugations of the adjacent sheets form channels or passageways which penetrate from one vertical edge or side 36 of the contact bodies (i.e., the gas inlet side) to the other side 38 (the gas outlet side) thereof. Thus the channels have both vertical and horizontal complements of direction, and a continuously varying width from zero at the points of contact between the layers to double the height of the corrugations. The sheets may be made of fibers of cellulose or inorganic material such as asbestos.

By this construction of the contact bodies, it will be seen that water distributed from the distributor 24 flows downwardly along both sides of the sheets in the contact bodies as a film, following a winding path which produces a very high rate of interaction between the liquid and gas flows. That is, while the water flows down in the form of a thin film along the sheets of the contact bodies, in a substantially vertical direction of flow, when the film following one sheet in an inclined direction downwardly meets a contact point between that sheet and the adjacent sheet the flow of the film is changed to the opposite direction. The cooling gas, e.g. air, on the other hand, enters through the openings formed by the channels in the inlet side 36 of the contact bodies in a substantially horizontal direction of flow and passes through the passageways to the outlet side 38 thereof.

As described in the above mentioned patent, the corrugations 32 are inclined downwardly at a different angle from the angle and direction of the corrugations 34 in alternate sheets. That is, the corrugations 34 are inclined upwardly, viewed in the flow direction of the gas, at a steeper angle of inclination than the corrugations 32 with the result that the bisector of the angle between the corrugations of the respective folds slopes downwardly toward the air intake side of the contact bodies.

By this construction the liquid film has a lateral component of flow which is greater for the corrugations 34 than for the corrugations 32, so that the basic effect will be that the films are maintained along the sheets when the horizontal air flow exercises a lateral force on the films in an opposite direction to the lateral component resulting from the inclined bisector angle between the corrugations. Thus there is less tendency for the liquid to migrate towards the gas outlet side 38 of the contact bodies.

In tall cooling towers of the type illustrated in FIG. 1 however a certain amount of the liquid will tend to migrate towards and even out of the gas outlet side 38 of the contact bodies. This particularly may happen where the gas flow rate is greater than the optimum desired. In these cases, the gas flow will have a greater effect on the liquid, tending to urge the liquid towards the gas outlet side of the contact bodies and to even form liquid droplets which may be expelled from the contact body. In order to overcome these problems, and to provide a correctional device which insures that all of the liquid passes through all of the contact body structure in the cooling tower, the present invention provides a plurality of separate contact bodies 12 located in generally vertical alignment. The contact bodies are mounted in the cooling tower so that their lower horizontal edges 40 (i.e., their liquid outlet edges) and their upper liquid inlet edges 42 are in slightly spaced relation to one another thereby to form a space or channel 44 that penetrates across the entire contact body.

In accordance with the present invention, a liquid distributor strip 46 is positioned in this channel along the gas outlet side of the contact bodies. This strip consists simply of a water impervious plate inserted in the channel between the contact bodies. The plate can simply rest on the liquid inlet side 42 of the lower contact body, or it may be mounted between the two adjacent bodies in channel 44 in any convenient manner. Preferably, the plate is adjustably mounted so that the depth of its penetration between the contact bodies, i.e., the depth of insertion into the contact bodies measured from the gas outlet side 38 thereof, can be adjusted in accordance with the operating conditions of the cooling tower. This plate can be formed of any liquid impervious material, such as metal or plastic, and preferably is selected from a material which will not be affected by the liquid being treated in the cooling water.

The effect of the distributor strip 46 is to direct liquid migrating towards the gas outlet side of the upper contact body, adjacent its liquid outlet edge 40 back towards the rear or gas inlet side of the contact body and into the lowermost contact body at a position remote from the gas outlet side of that lower body. In this manner, the distributor plate corrects the liquid flow through the cooling tower contact bodies to insure that the liquid is not expelled from the bodies through the gas outlet edges. As seen in FIG. 1, where an extremely tall cooling tower is used, a plurality of independent contact bodies can be arranged, with separate liquid distribution strips 46 mounted therebetween for the same purpose.

Figure 3:
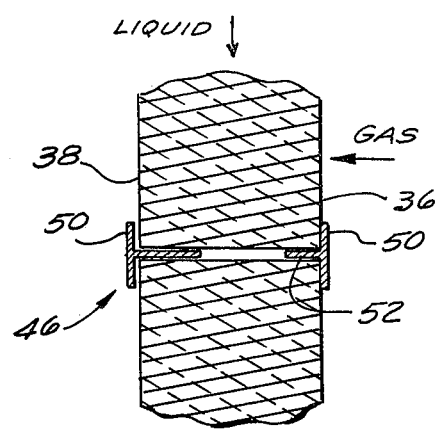
FIG. 3 is an enlarged fragmentary view showing another embodiment of the liquid distribution strip of the present invention positioned between two vertically aligned contact bodies.

Although the liquid distributor strips 46 cna simply be flat plates, it is contemplated that the strips can be provided with extension portions 48 that extend beyond the gas outlet edge of the contact bodies, as seen in FIGS. 1 and 2. Preferably this extension is inclined upwardly. The extension 48 constructed in this manner serves to collect or catch liquid droplets which may be expelled from the contact body through the gas outlet side thereof above the liquid outlet side 40 of the body. By capturing the liquid droplets, the liquid is redirected down the inclined extension 48 onto the flat portion of the distributor strip between the two adjacent contact bodies and towards the rear or gas inlet side of the contact bodies into the lower body of the pair. The length of the extension 48 is selected in accordance with the operating conditions of the cooling tower in order to insure that substantially all liquid droplets that may be expelled from the contact body are captured by the distributor strip and redirected into the lower contact body.

Where the formation of liquid droplets is not a problem in cooling towers, the distributor strip can be formed in the manner illustrated in FIG. 3, simply as a flat plate extending between the edges 40, 42 of the respective bodies. However, it is preferred that the plate include a perpendicularly extending dam member 50, extending along the gas outlet side 38 of the contact bodies to prevent liquid discharge from the contact bodies through the lowermost corrugations of the body. That is, liquid flowing in these lowermost corrugations, adjacent the outlet edge 40 of the contact body will not encounter a contact point between adjacent sheets so as to have its flow direction reversed, but rather would continue to flow out of the contact body unless the dam plate 50 is provided. This plate serves to redirect the liquid back towards the gas inlet side of the contact body, onto the distributor plate 46 and into the lower contact body.

Although the above description of the invention has been primarily related to the use of a liquid distributor strip adjacent the gas outlet side of the contact bodies, it will be appreciated that it is also useful to provide a distributor plate of similar construction adjacent the gas inlet side. Such a plate is shown in detail in FIGS. 2 and 3 and consists generally of a T-shaped member having a distributor plate portion 52 located in the space 44 between the contact bodies and includes a dam plate 50 extending along the gas inlet edge 36 thereof. This plate will serve to insure that liquid flowing in the corrugations adjacent the bottom edge 40 of the upper contact body and towards the gas inlet side, will not flow out of the corrugations but will be redirected to the lower contact body at a position inwardly of the gas inlet edge thereof. Preferably the dimension of the distributor plate 52 will be selected such that it will deposit liquid on a lower contact body at positions wherein the liquid will be directed towards the center of the body and engage contact points between corrugations to have its flow reversed away from the gas inlet edge, so as to insure that the liquid will follow a passage through the entire length of the contact body.

Accordingly, it will be appreciated that the construction of the present invention provides a gas and liquid contact apparatus or cooling tower which insures that all of the liquid supplied to the contact bodies of the tower will pass through the entire height of the contact bodies therein. The combination of the use of contact bodies of the type described in U.S. Pat. No. 3,792,841 and the distributor strips 46, 52, provides a highly efficient cross flow unit which will insure complete contact between the liquid and the gas under substantially all gas and liquid flow conditions. The contact body construction basically insures against the formation of liquid droplets, and the distributor strips serve to redirect any droplets which may form to further insure that in an extremely tall tower all of the liquid passes through the entire height of the contact bodies.

Although illustrative embodiments of the present invention have been described herein with reference to the accompanying drawings, it is to be understood that the invention is not limited to those precise embodiments, and that various changes and modifications may be effected therein by one skilled in the art without departing from the scope or spirit of this invention.

What is claimed is:

1. A gas and liquid contact apparatus comprising, in combination, at least one pair of generally vertically aligned contact bodies having pairs of generally vertically aligned and horizontally extending edge portions, the opposed adjacent horizontal edges of said bodies being located in slightly spaced relation to one another, said contact bodies having passageways formed therein penetrating between said two opposed vertical edges therein and the horizontal edges thereof being open to admit liquid into said passageways, and a liquid impervious distribution strip located between said opposed adjacent and spaced horizontal edges of the contact bodies and across one of said vertical edges, said strip extending generally horizontally inwardly of said one vertical edge a limited distance to cover only a limited edge portion of the horizontal edge of the contact body immediately thereabove, thereby to deflect liquid adjacent said one vertical edge towards the center of said contact apparatus in a direction towards the other of said vertical edges and directly into the contact body therebelow.

2. The gas and liquid contact apparatus as defined in claim 1 wherein said contact bodies include a pair of vertical side walls extending between said pairs of vertical edges; and said liquid distribution strip extending between said side walls.

3. A gas and liquid contact apparatus comprising, in combination, at least one pair of generally vertically aligned contact bodies having pairs of generally vertically and horizontally extending edge portions, the opposed adjacent horizontal edges of said bodies being located in slightly spaced relation to one another, said contact bodies having passageways formed therein penetrating between said two opposed vertical edges therein and the horizontal edges thereof being open to admit liquid into said passageways, and a liquid impervious distribution strip located between said opposed adjacent and spaced horizontal edges of the contact bodies and across one of said vertical edges to deflect liquid adjacent said one vertical edge towards the other of said vertical edges and into the contact body therebetween: said contact bodies including a pair of vertical sidewalls extending between said pairs of vertical edges; and said liquid distribution strip extending between said sidewalls and being adjustably mounted between said contact bodies to permit adjustment of the amount of penetration of said strip between said bodies inwardly of said one vertical edge.

4. The gas and liquid contact apparatus as defined in claim 3 wherein said one vertical edge of said contact bodies is located on the side of said body opposite to the vertical edge at which the gas enters the bodies.

5. The gas and liquid contact apparatus as defined in claim 4 wherein said distribution strip includes an extension located outside of said bodies adjacent said one vertical edge thereof to collect droplets of liquid blown out of the upper contact body by the gas and to redirect said droplets into the lower contact body.

6. The gas and liquid contact apparatus as defined in claim 5 wherein said extension is bent upwardly, outside of said contact bodies, from the plane of the portion of the distribution strip located between the contact bodies.

7. The gas and liquid contact apparatus as defined in claim 1 wherein said contact bodies are of substantially identical construction and each consists of first and second sets of corrugated sheets having corrugations extending between said vertical edges with the sheets of the first set disposed alternately with the sheets of the second set whereby the corrugations of the first set cross the corrugations of the second set to form said passageways therebetween.

8. The gas and liquid contact apparatus as defined in claim 7 wherein the corrugations of said first set of sheets are inclined upwardly in the direction of the gas flow and the corrugations of said second set of sheets inclined downwardly in the direction of gas flow, the inclinations of said crossed corrugations being non-symmetrical relative to a vertical plane extending perpendicular to the direction of the gas stream as it enters said sheets, the corrugations of said first set of sheets having a greater inclination to the horizontal plane than the corrugations in said second set of sheets and defining a bisector of the angle between said corrugations of said two sets of sheets inclining downwardly in a direction opposite to the direction of the air flow.

9. A gas and liquid contact apparatus in which gas and liquid flow in cross flow relation to one another, comprising, in combination, at least one pair of generally vertically aligned spaced contact bodies, each of which includes a pair of opposed generally horizontally extending edges respectively defining liquid inlet and outlet edges and a pair of opposed generally vertically extending edges respectively defining gas inlet and gas outlet edges in the contact bodies, the vertical edges of said contact bodies being located in generally vertical alignment, and wherein the liquid outlet edge of the upper of said two bodies is located above and slightly spaced from the liquid inlet edge of the lower of the two bodies to define a space therebetween; said contact bodies each being formed of first and second sets of corrugated sheets having corrugations disposed in a direction extending generally between said opposed vertical edges; said sheets of said first set being disposed alternately with the sheets of said second set with the corrugations of the said first set crossing the corrugations of said second set, said crossed corrugations defining passageways penetrating from one vertical edge to the other vertical edge of said body, the corrugations of said corrugated sheets bearing against one another in such a way that the sheets touch where the crests of their respective corrugations cross, the corrugations of said first set of sheets being inclined upwardly in the direction of the gas flow, the corrugations of said second set of sheets inclining downwardly in the direction of gas flow, the inclinations of said crossed corrugations being non-symmetrical relative to the gas stream entering said gas inlet edge of the contact body, the corrugations of said first set of sheets having a greater inclination to said horizontal plane than the corrugations in said second set of sheets and defining a bisector of the angle between said corrugations of said two sheets inclining downwardly in a direction opposite to the direction of the air flow, and a liquid impervious liquid distribution strip located in said space between the opposed horizontal edges of the contact bodies and extending only along the gas outlet edges thereof and only a limited distance into the space between said contact bodies to cover only a limited portion of the horizontal liquid outlet edge of the contact body immediately thereabove, thereby to deflect liquid adjacent the gas outlet edge of the upper contact body towards the center of said contact apparatus in a direction towards the gas inlet edge thereof and directly into the liquid inlet edge of the lower contact body.

10. A gas and liquid contact apparatus in which gas and liquid flow in cross relation to one another comprising, in combination, at least one pair of generally vertically aligned spaced contact bodies, each of which includes a pair of opposed generally horizontally extending edges respectively defining liquid inlet and liquid outlet edges and a pair of opposed generally vertically extending edges respectively defining gas inlet and gas outlet edges in the contact bodies, and wherein the liquid outlet edge of the upper of said two bodies is located above and slightly spaced from the liquid inlet edge of the lower of the two bodies to define a space therebetween; said contact bodies each being formed of first and second sets of corrugated sheets having corrugations disposed in a direction extending generally between said opposed vertical edges; said sheets of said first set being disposed alternately with the sheets of said second set with the corrugations of the said first set crossing the corrugations of said second set, said crossed corrugations defining passageways penetrating from one vertical edge to the other edge of said body, the corrugations of said corrugated sheets bearing against one another in such a way that the sheets touch where the crest of their respective corrugations cross, the corrugations of said first set of sheets being inclined upwardly in the direction of the gas flow, the corrugations of said second set of sheets inclining downwardly in the direction of gas flow, the inclinations of said crossed corrugations being non-symmetrical relative to the gas stream entering said gas inlet edge of the contact body, the corrugations of said first set of sheets having a greater inclination to said horizontal plane than the corrugations in said second set of sheets and defining a bisector of the angle between said corrugations of said two sets of sheets inclining downwardly in a direction opposite to the direction of the air flow, and a liquid impervious liquid distribution strip located in said space between the opposed horizontal edges of the contact bodies and extending along the gas outlet edges thereof to deflect liquid adjacent the gas outlet edge of the upper contact body towards the gas inlet edge thereof and into the liquid inlet edge of the lower contact body; said liquid distribution strip being adjustably mounted in said space between said contact bodies to permit adjustment of the amount of penetration of said strip between said bodies inwardly of said gas outlet edges.

11. The gas and liquid contact apparatus as defined in claim 10 wherein said distribution strip includes an extension located outside of said bodies adjacent the gas outlet edges to collect droplets of liquid blown out of the upper contact body by the gas and to redirect said droplets into the lower contact body.

12. The gas and liquid contact apparatus as defined in claim 11 wherein said extension is bent upwardly, outside of said contact bodies, from the plane of the portion of the distribution strip located between the contact bodies.

13. The gas and liquid contact apparatus as defined in claim 9 including a second liquid distribution strip located in said space between the opposed horizontal edges of the contact bodies and extending along the gas inlet edges thereof.

14. The gas and liquid contact apparatus as defined in claim 9 wherein said liquid distribution strip is a flat plate and includes a vertical dam plate extending along the gas outlet edge of said contact bodies.

* * * * *